United States Patent [19]

Bertolucci et al.

[11] Patent Number: 5,763,330
[45] Date of Patent: Jun. 9, 1998

[54] EXTRUSION COATED FABRIC

[75] Inventors: Michael D. Bertolucci, Greensboro; Earl T. Crouch, High Point; Keith N. Gray, Greensboro, all of N.C.

[73] Assignee: Highland Industries, Inc., Greensboro, N.C.

[21] Appl. No.: 536,167

[22] Filed: Sep. 29, 1995

[51] Int. Cl.$^6$ .................................................. B32B 27/34
[52] U.S. Cl. ............................. 442/65; 442/64; 442/164
[58] Field of Search ................................ 428/284, 287; 442/64, 65, 164

[56] References Cited

U.S. PATENT DOCUMENTS

| | | | |
|---|---|---|---|
| 3,452,800 | 7/1969 | Kline, Jr. | 152/356 |
| 3,506,513 | 4/1970 | Kline, Jr. | 156/110 |
| 3,705,645 | 12/1972 | Konen | 206/46 R |
| 3,730,551 | 5/1973 | Sack et al. | 280/150 |
| 3,807,754 | 4/1974 | Rodenbach et al. | 280/150 AB |
| 3,810,654 | 5/1974 | DeBano, Jr. et al. | 280/150 AB |
| 3,842,583 | 10/1974 | Gage | 57/140 R |
| 3,879,056 | 4/1975 | Kawashima et al. | 280/150 AB |
| 3,892,425 | 7/1975 | Sakairi et al. | 280/150 AB |
| 3,937,488 | 2/1976 | Wilson et al. | 280/150 AB |
| 4,356,227 | 10/1982 | Stenzenberger | 428/265 |
| 4,522,872 | 6/1985 | Berczi et al. | 428/257 |
| 4,537,817 | 8/1985 | Guillaume | 428/260 |
| 4,656,073 | 4/1987 | Harris | 428/85 |
| 4,921,735 | 5/1990 | Bloch | 428/34.9 |
| 5,073,418 | 12/1991 | Thornton et al. | 428/34.9 |
| 5,091,230 | 2/1992 | Fuchs et al. | 428/36.4 |
| 5,110,666 | 5/1992 | Menzel et al. | 428/196 |
| 5,114,180 | 5/1992 | Kami et al. | 280/743 |
| 5,193,847 | 3/1993 | Nakayama | 280/738 |
| 5,236,775 | 8/1993 | Swoboda et al. | 428/225 |
| 5,254,621 | 10/1993 | Inoue et al. | 524/837 |
| 5,258,211 | 11/1993 | Momii et al. | 428/35.2 |
| 5,280,948 | 1/1994 | Henseler et al. | 280/728 |
| 5,280,952 | 3/1994 | Hirabayashi et al. | 280/739 |
| 5,296,278 | 3/1994 | Nishimura et al. | 428/36.1 |
| 5,336,538 | 12/1994 | Nitamura | 428/35.2 |

FOREIGN PATENT DOCUMENTS

| | | |
|---|---|---|
| 0254446 | 1/1989 | Japan. |
| 0063949 | 3/1990 | Japan. |

*Primary Examiner*—Helen Lee
*Attorney, Agent, or Firm*—Rhodes, Coats & Bennett, L.L.P.

[57] ABSTRACT

A method and apparatus for extrusion coating a nylon fabric or the like. The apparatus includes a supply roll for supplying a length of fabric having a top and bottom surface and a take-up roll for taking up the length of fabric. An extrusion coating head located between the supply roll and the take-up roll and perpendicular to the movement of the length of fabric applies a plastic coating onto one surface of the length of fabric. A combining roll located between the supply roll and the take-up roll and adjacent to the extrusion coating head joins the plastic coating to the one surface of the length of fabric. In the preferred embodiment, the combining roll is heated to provide improved adhesion of the plastic coating onto the surface of the length of fabric while, at the same time, a water mist prevents sticking. The resulting fabric has a tear strength of greater than about 50 pounds and a weight of less than about 5.5 oz. per sq. yd.

3 Claims, 2 Drawing Sheets

5,763,330

EXTRUSION COATED FABRIC

BACKGROUND OF THE INVENTION (1) Field of the Invention

The present invention relates generally to extrusion coating and, more particularly, to a method for coating a nylon or polyester fabric or the like using an extrusion coating process.

(2) Description of the Prior Art

Extrusion coating has been used primarily in the packaging industry. For example, juice boxes and milk and cream containers account for about 80% of the extrusion coating business. In addition to extrusion coating of packaging materials, extrusion coatings have also been used to provide antiseptic containers for medical liquids, carpet backing, and cleanable wall coatings.

Air impermeable fabrics, such as are used for airbags, are presently solvent coated. There are many problems associated with solvent coating, not the least of which are the environmental hazards associated with the solvent itself. In addition to these problems, solvent coating such as conventional knife over roll coating systems normally can operate about 15 yards a minute. In addition, the costs of the resin system used in the solvent coating process ranges between $20–40 per pound. To the contrary, an extrusion coating process, such as used by the packaging industry, may operate at up to 400 yards a minute with a cost of $1–2 per pound for the thermoplastic coating materials. Also, in addition to environmental costs and speed considerations, thermoplastic extrusion coatings theoretically are mechanically stronger than rubber-based coatings such as are conventionally used to produce air impermeable airbag fabrics. However, in spite of these apparent advantages of speed and low cost thermoplastic polyolefin coatings, adhesion to nylon fabrics is poor, or does not provide a satisfactory finish such as is found with polyethylene and polypropylene.

Thus, there remains a need for a new improved method and apparatus for applying a extrusion coatable thermoplastic to a nylon fabric having good adherence, good surface finish and resistance to heat and pressure.

SUMMARY OF THE INVENTION

The present invention is directed to a method and apparatus for extrusion coating a nylon fabric or the like. The apparatus includes a supply roll for supplying a length of fabric having a top and bottom surface and a take-up roll for taking up the length of fabric. An extrusion coating head located between the supply roll and the take-up roll and perpendicular to the movement of the length of fabric applies a plastic coating onto one surface of the length of fabric. A combining roll located between the supply roll and the take-up roll and adjacent to the extrusion coating head joins the plastic coating to the one surface of the length of fabric.

In the preferred embodiment, the combining roll is heated to provide improved adhesion of the plastic coating onto the surface of the length of fabric while, at the same time, a water mist prevents sticking. The resulting fabric has a tear strength, when tested according to ASTM D1682, of greater than about 50 pounds and a weight, when tested according to ASTM 5041, of less than about 5.5 oz. per sq. yd.

Accordingly, one aspect of the present invention is to provide an apparatus for extrusion coating a nylon fabric or the like. The apparatus includes: (a) a supply roll for supplying a length of fabric having a top and bottom surface; (b) a take-up roll for taking up the length of fabric; (c) an extrusion coating head located between the supply roll and the take-up roll and perpendicular to the movement of the length of fabric for applying a plastic coating onto one surface of the length of fabric; and (d) a combining roll located between the supply roll and the take-up roll and adjacent to the extrusion coating head for joining the plastic coating to the one surface of the length of fabric, wherein the combining roll is heated to provide improved adhesion of the plastic coating onto the surface of the length of fabric.

Another aspect of the present invention is to provide a method for extrusion coating a nylon fabric or the like. The method includes the steps of: (a) supplying a length of fabric having a top and bottom surface from a supply roll; (b) taking up the length of fabric onto a take-up roll; (c) applying a plastic coating onto one surface of the length of fabric by an extrusion coating head located between the supply roll and the take-up roll and perpendicular to the movement of the length of fabric; and (d) joining the plastic coating to the one surface of the length of fabric by a combining roll located between the supply roll and the take-up roll and adjacent to the extrusion coating head, wherein the combining roll is heated to provide improved adhesion of the plastic coating onto the surface of the length of fabric.

Still another aspect of the present invention is to provide an extrusion coated fabric having a bottom layer of fabric and a top layer of linear low density polyethylene plastic (LLDPE).

Still another aspect of the present invention is to provide an extrusion coated fabric having a tear strength, when tested according to ASTM D1682, of greater than about 50 pounds and a weight, when tested according to ASTM 5041, of less than about 5.5 oz. per sq. yd.

These and other aspects of the present invention will become apparent to those skilled in the art after a reading of the following description of the preferred embodiment when considered with the drawings.

DESCRIPTION OF THE PREFERRED EMBODIMENTS

Figure 1:
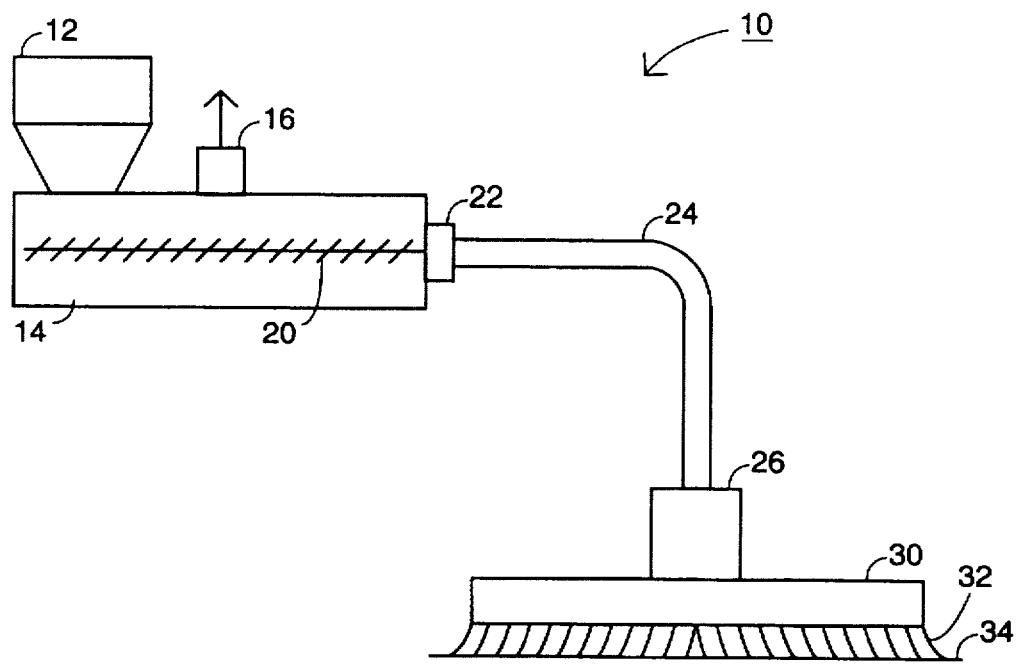
FIG. 1 is a front schematic view of an extrusion coating machine constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an extrusion coating machine, generally designated 10, is shown constructed according to the present invention.

The extrusion coating machine is of a conventional design, such as a Battenfeld Gloucester/Rotomec America Rotocoat Extruder 1220/100, having a resin hopper/dryer 12 for introducing resin into melt zone 14 of the extruder. A vacuum source 16 devolatizes the resin as it melts. A pump 20 forces the melted resin through a diehead 22 and a melt pipe 24. Melt pipe 24 is connected to a feed block 26 which is attached to diehead 30. Diehead 30 spreads out the melt curtain 32 onto the rapidly moving substrate 34 underneath the melt curtain.

Figure 2:
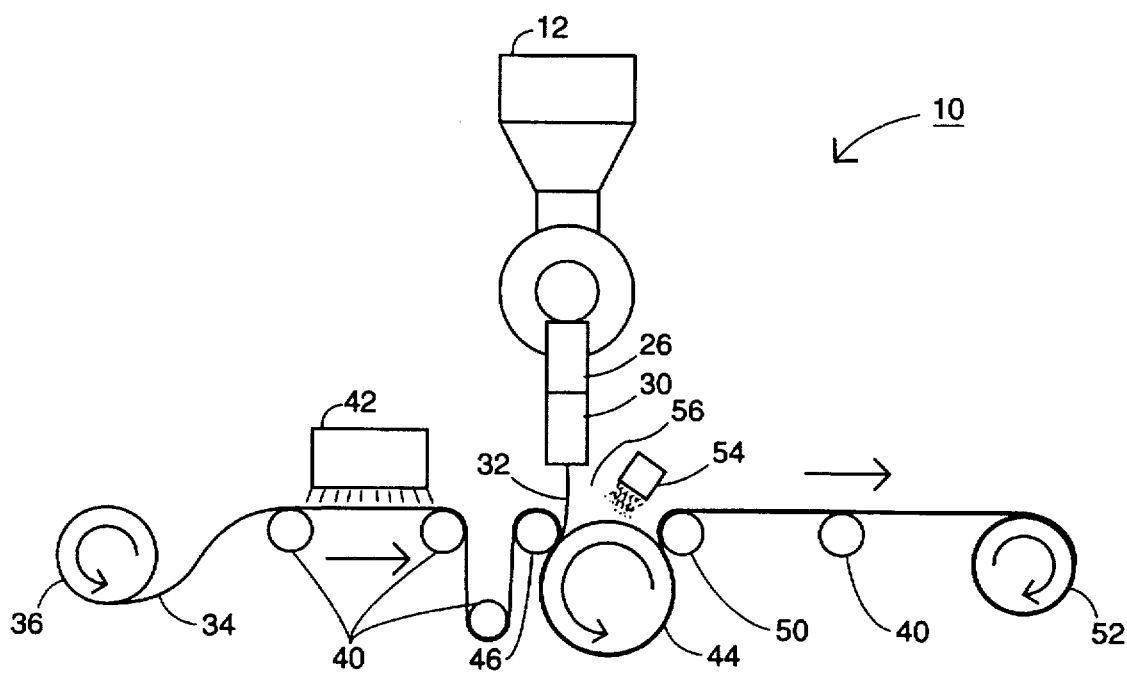
FIG. 2 is a side schematic view of the extrusion coating machine shown in FIG. 1.

As best seen in FIG. 2, there is shown a side elevational view of the extrusion coating machine shown in FIG. 1. Extrusion coating machine 10 also includes a substrate supply roll 36 for supplying the substrate to the extruder 10. Plurality of rollers 40 convey the substrate to the extruder. In the preferred embodiment, a pretreatment zone 42 consisting of a corona discharge or flame pretreatment prepares one surface of the substrate for the extrusion coating. A large roller combines the substrate 34 and the melt curtain 32 with the aid of pinch rollers 46 and 50. A takeup roll 52 receives the combined coated substrate.

Unlike the prior art, in which roller 44 is normally chilled, in the present invention it has been found that it is necessary to heat roll 44 up to about >180° F. for proper adhesion. In addition, pull-off preferably is further improved to prevent sticking to the roll by the addition of a water mister 54 which coats the surface of heated roll 44 as the melt curtain and substrate are combined. However, it was found that the water mister 54 was only effective in combination with the heated roll. Finally, it has been found that both the air gap 56 and angle 58 where the melt curtain contacts the substrate and heated roll 34 are critical. Specifically, air gap 56 should be between about 1 and 2 inches. In addition, the angle of incidence 58 should be between about 45° and 75°.

With respect to extrusion coating a nylon fabric, it has been found that the application of a top layer of linear low density polyethylene plastic (LLDPE) onto a bottom layer of fabric produces an extrusion coated fabric having improved adherence. Additionally, it has been discovered that the use of a co-extruded tielayer between the nylon substrate and the LLDPE further improves adhesion.

In one embodiment of the present invention, a co-extruded tielayer of an anhydride modified ethylene vinyl acetate (EAA) having a VICAT of less than about 100° C. is used between the nylon substrate and the LLDPE. A disadvantage, however, in using most tielayers having a VICAT of less than 100° C. is that very severe sticking problems can occur when coating nylon fabrics. This is true for EAA. Such problems occur because the tielayer actually penetrates the fabric and exits out of the opposite surface. On the other hand, a tielayer with a VICAT of greater than about 100° C. also presents certain problems. For example, acid modified ethylene vinyl acrylate polymer (EVA) was found to produce an unstable melt curtain that does not produce a satisfactory finish.

The inventors found in the preferred embodiment of the present invention that by blending EVA and EAA, a tielayer is produced that will not penetrate so far as to stick, and still provides a stable melt curtain. Preferably, about 15 wt. % EVA having a higher VICAT is combined with about 85 wt. % EAA having a lower VICAT. This combination provided adequate coating without excessive penetration while, at the same time, provided a stable melt curtain. Similar results can be achieved with a blend of between about 5 wt. % and about 55 wt. % EVA having a higher VICAT and between about 45 wt. % and 95 wt. % EAA having a lower VICAT.

The EVA of the present invention is preferably 2022 coextrudable adhesive resin available under the tradename BYNEL from E.I. duPont of Wilmington, Del. The EAA of the present invention is preferably 3990 coextrudable adhesive resin available under the tradename BYNEL from E.I. DuPont of Wilmington, Del.

Figure 3:
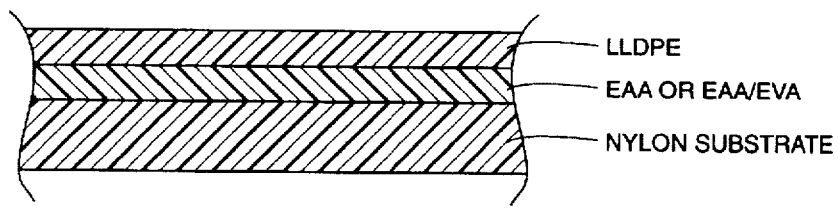
FIG. 3 is a cross-sectional view of an airbag fabric produced according to the present invention.

Turning to FIG. 3, there is shown a cross-sectional view of an airbag fabric produced according to the present invention. The resulting airbag fabric has an LLDPE top coating of between about 0.005 and 0.007 inches and preferably about 0.006 inches. The EAA or EAA/EVA tielayer coating preferably is between about 0.003 and 0.004 inches and preferably about 0.003 inches.

Figure 4:
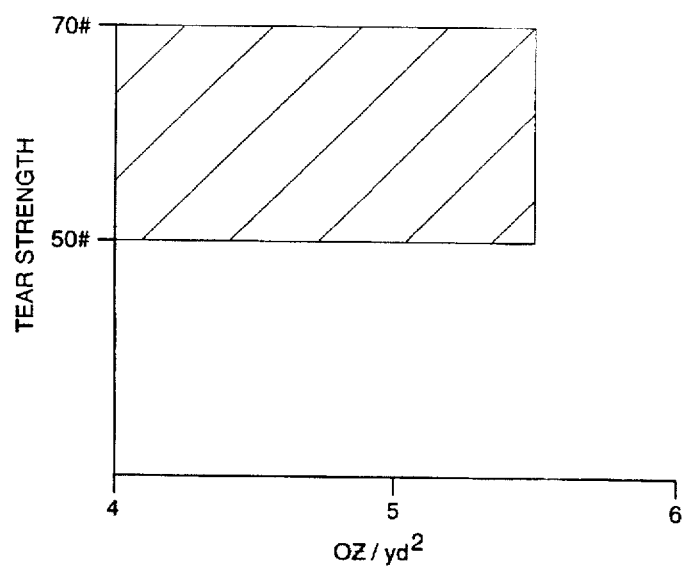
FIG. 4 is a graphical representation of the physical characteristics of an airbag fabric produced according to the present invention.

Finally turning to FIG. 4, there is shown a graphical representation of the physical characteristics of the airbag fabric produced according to the present invention. As can be seen, the tear strength of the coated fabric, when tested according to ASTM D1682, is greater than about 50 pounds and the weight of the coated fabric, when tested according to ASTM 5041, is less than about 5.5 oz. per sq. yd. In addition, the airbag fabric produced according to the present invention has a increased crease flex test value of about grade 4, when tested according to SM5 4-3-8.

Certain modifications and improvements will occur to those skilled in the art upon a reading of the foregoing description. By way of example, it is contemplated that the extrusion coated fabric may be further enhanced by treating the fabric with sizing or adhesion promoters during the extrusion step.

It should be understood that all such modifications and improvements have been deleted herein for the sake of conciseness and readability but are properly within the scope of the following claims.

We claim:

1. An extrusion coated fabric having a bottom layer of nylon fabric and a top layer of linear low density polyethylene plastic (LLDPE), said extrusion coated fabric having a tear strength, when tested according to ASTM D1682, of greater than about 50 pounds and a weight, when tested according to ASTM 5041, of less than about 5.5 oz. per sq. yd.

2. The extrusion coated fabric according to claim 1, further including a tielayer of anhydride modified ethylene vinyl acetate (EAA).

3. The extrusion coated fabric according to claim 1, further including a tielayer of a blend of anhydride modified ethylene vinyl acetate (EAA) and acid modified ethylene vinyl acrylate polymer (EVA).

* * * * *